US010465490B2

(12) United States Patent
Collins et al.

(10) Patent No.: US 10,465,490 B2
(45) Date of Patent: Nov. 5, 2019

(54) WELL TREATMENT FIBER DELIVERY SYSTEM

(71) Applicant: Eastman Chemical Company, Kingsport, TN (US)

(72) Inventors: Nick Allen Collins, Fall Branch, TN (US); S. M. Bedarul Islam, Kingsport, TN (US); Brian Douglas Seiler, Kingsport, TN (US); Ronald Buford Sheppard, Kingsport, TN (US); Steven Anthony Wilson, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 337 days.

(21) Appl. No.: 15/212,325

(22) Filed: Jul. 18, 2016

(65) Prior Publication Data

US 2018/0016885 A1  Jan. 18, 2018

(51) Int. Cl.
| B65H 35/06 | (2006.01) |
| E21B 43/26 | (2006.01) |
| E21B 33/14 | (2006.01) |
| E21B 21/00 | (2006.01) |
| B65H 51/005 | (2006.01) |
| B65H 59/10 | (2006.01) |
| B65H 59/24 | (2006.01) |

(52) U.S. Cl.
CPC .......... E21B 43/26 (2013.01); B65H 35/06 (2013.01); B65H 51/005 (2013.01); B65H 59/105 (2013.01); B65H 59/24 (2013.01); E21B 21/003 (2013.01); E21B 33/14 (2013.01); C09K 2208/08 (2013.01)

(58) Field of Classification Search
CPC ................ D01G 7/00; E21B 43/267
See application file for complete search history.

(56) References Cited

U.S. PATENT DOCUMENTS

| 3,658,626 A | 4/1972 | Berger et al. |
| 8,322,424 B2 | 12/2012 | Leugemors et al. |
| 8,461,066 B2 | 6/2013 | Robertson et al. |

(Continued)

FOREIGN PATENT DOCUMENTS

| EP | 2 305 450 A1 | 4/2011 | |
| WO | WO 2007/068344 | * 6/2007 | ............... C11D 1/00 |

OTHER PUBLICATIONS

Notification of Transmittal of the International Search Report and The Written Opinion of the International Searching Authority, or the Declaration, International Application No. PCT/US2017/041862 dated Oct. 16, 2017.

Primary Examiner — William D Hutton, Jr.
Assistant Examiner — Avi T Skaist
(74) Attorney, Agent, or Firm — Kenrick L. Vidale; Matthew W. Smith

(57) ABSTRACT

A fiber delivery system capable of providing cut fiber segments for use in treating an oil and/or gas well. The fiber delivery system can utilize bales of a continuous filamentary tow that are transported to the well site from a remote manufacturing location. At the well site, a multifilament strand can be pulled off the bale, opened, and cut to provide cut fiber segments. The cut fiber segments can be mixed with other well treatment components to create a well treatment medium that is introduced into the well as part of a drilling, stimulation, or cementing process.

27 Claims, 2 Drawing Sheets

(56) References Cited

U.S. PATENT DOCUMENTS

| | | |
|---|---|---|
| 8,778,851 B2 | 7/2014 | Daccord |
| 9,016,377 B2 | 4/2015 | Leugemors et al. |
| 2006/0053593 A1* | 3/2006 | Gombash, Jr. ........... D01G 7/00 19/66 T |
| 2008/0245527 A1 | 10/2008 | Leugemors et al. |
| 2014/0228258 A1* | 8/2014 | Mahoney ............... C09K 8/805 507/219 |
| 2014/0255691 A1 | 9/2014 | Sehgal et al. |
| 2015/0284879 A1 | 10/2015 | Takahashi et al. |
| 2016/0102244 A1 | 4/2016 | Takahashi et al. |

\* cited by examiner

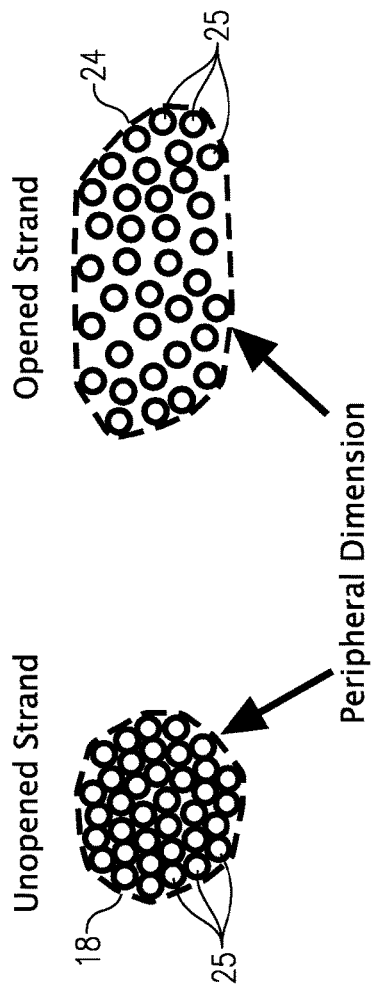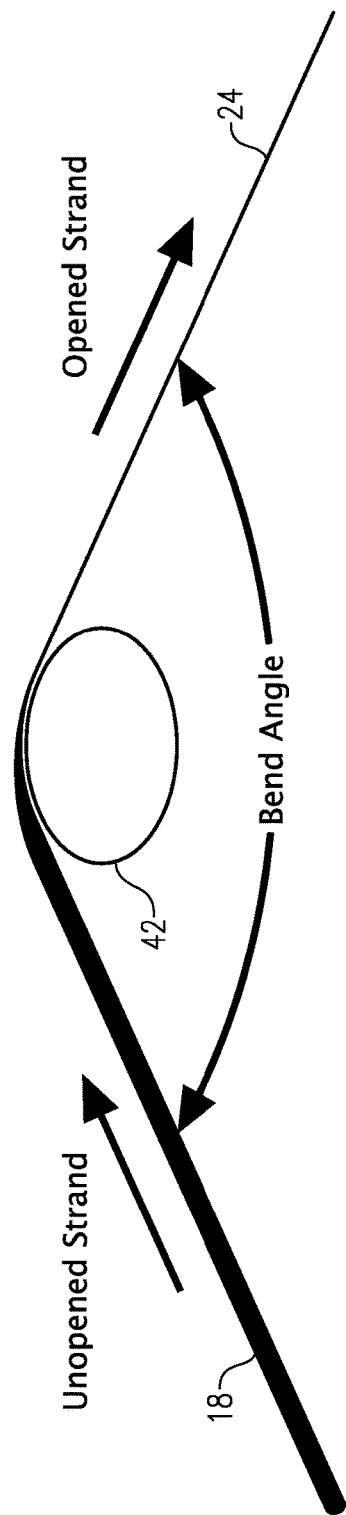

WELL TREATMENT FIBER DELIVERY SYSTEM

FIELD

The present invention relates to the treatment of oil and gas wells. More particularly, the invention concerns a method and apparatus for delivering fibers to be used in treatment mediums for oil and gas wells.

BACKGROUND

The benefits of using fibers in well treatment fluids are well known and have been demonstrated for all phases of well construction including drilling, cementing, and stimulation. Fibers may be advantageously added to drilling fluids or "muds" and cementing fluids or "cement" to reduce or prevent loss of these fluids to the underground formation during circulation. More recently, and at higher volumes, fibers have been added to stimulation fluids likewise to control fluid loss by building filter cakes, but also to prevent proppant flow-back, help transport proppant, serve as a degradable channelant, and/or divert flow to the formation area of interest. Fibers can also be a key element of diverting agents or "pills" used to temporarily redirect or divert flow during refracturing operations. Because such applications may require tens or even hundreds of tons of fiber per well, these wells are remotely located, and the time between starting and finishing a well is relatively short (a few months or even weeks), it is important that the system used to deliver the fibers be very efficient, meaning cost advantaged with minimal labor and sustainable packaging.

In the past, cut staple fibers have been prepared at a centralized location a considerable distance away from the well pad. The cut staple fibers were then packaged in bags or boxes, transported to the well, and mixed with other components of the well treatment fluid at the remote well location. Compaction of the cut staple fibers in the bags or boxes has been used to reduce shipping costs. However, when opened and used, the cut staple fibers decompress and become airborne, leading to fiber loss and worker exposure. Further, at high usage rates, such as required for some stimulation fluid applications, the number of bags or boxes that must be handled to match the desired feed rate becomes problematic. Precisely controlling the feed rate of cut fibers from bags or boxes can also be difficult.

Accordingly, a need exists for a system that can safely and efficiently provide large quantities of cut fibers at controllable rates to remote locations for use in well treatment mediums.

SUMMARY

In accordance with one embodiment of the present invention, there is provided a well treatment method comprising the following steps: (a) providing at least 100 meters of a continuous filamentary tow in the form of a bale; (b) drawing a strand of the filamentary tow off the bale, wherein the strand comprises a plurality of individual continuous filaments; (d) increasing the average spacing between the individual continuous filaments of the strand to thereby produce an opened strand; (e) cutting the opened strand into cut fiber segments; (f) combining the cut fiber segments with one or more additional components to form a well treatment medium; and (g) introducing the well treatment medium into a well.

In accordance with another embodiment of the invention, there is provided a well treatment system comprising: (a) a bale station for receiving a bale of continuous filamentary tow; (b) a puller for drawing a strand of the continuous filamentary tow off the bale, wherein the strand comprises a plurality of individual continuous filaments; (c) an opener for receiving the strand and increasing the average spacing between the individual continuous filaments, thereby producing an opened strand; and (d) a chopper for cutting the opened strand into cut fiber segments.

BRIEF DESCRIPTION OF THE DRAWINGS

FIG. 2 is an exemplary cross-sectional view of a multifilament fiber strand in an unopened state and an open state, particularly illustrating that the peripheral dimension of the opened strand is greater than the peripheral dimension of the unopened strand.

FIG. 3 is a schematic representation of multifilament fiber strand being opened by passing the tensioned strand over a smooth surface at a bend angle.

DETAILED DESCRIPTION

Figure 1:
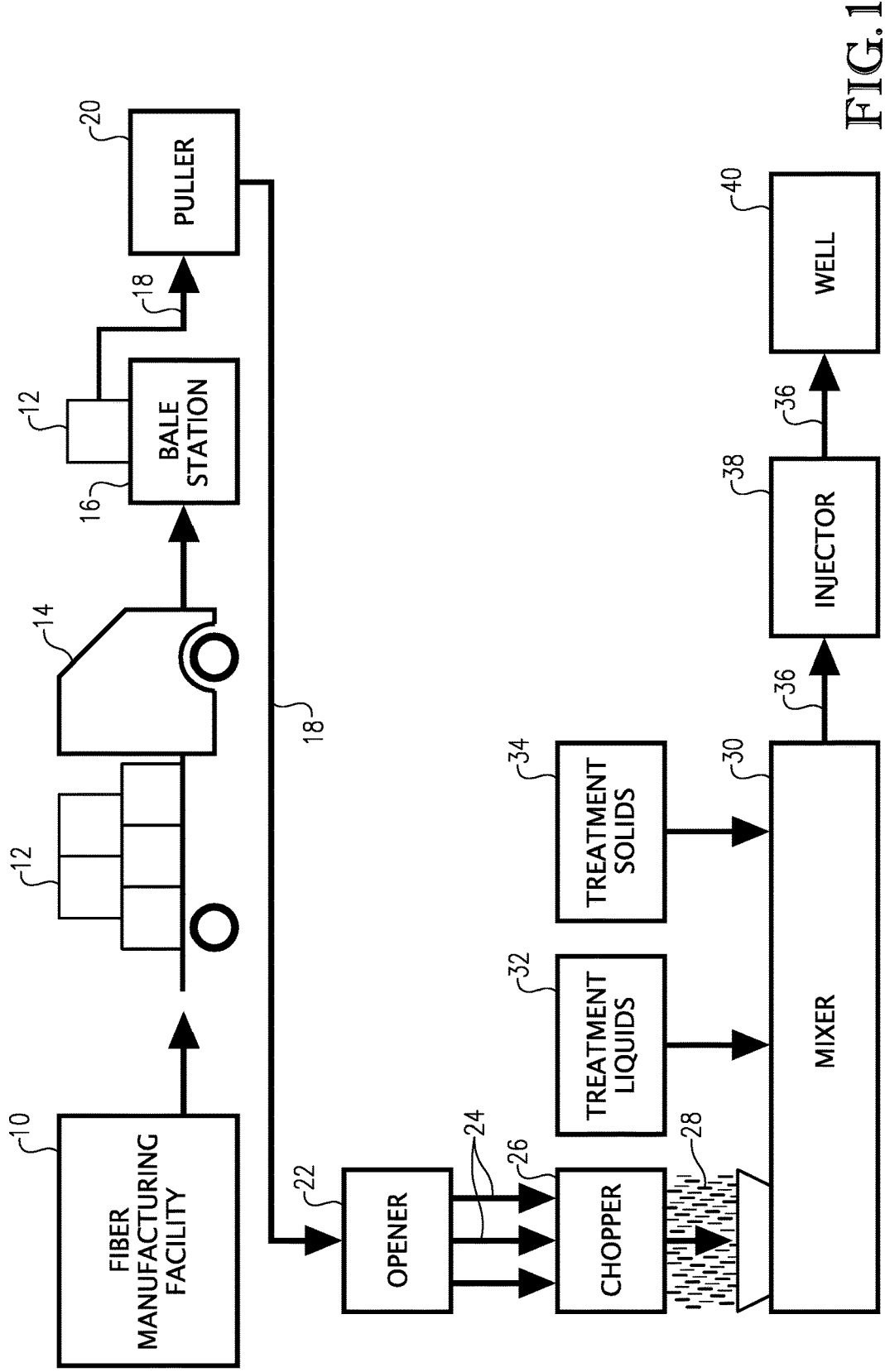
FIG. 1 is a schematic representation of the steps and equipment involved in forming a fiber-containing well treatment medium and injecting the well treatment medium into a well, particularly illustrating a fiber delivery system configured in accordance with one embodiment of the present invention.

Although the following description makes references to FIGS. 1-3, it should be understood that the features depicted in the drawings only represent one exemplary embodiment of the inventive technology. Certain steps or components depicted in the drawings may be rearranged and/or eliminated without departing from the inventive concept. Further, certain steps or components not depicted in the drawings may be added without departing from the inventive concept.

Turning initially to FIG. 1, a system is depicted for treating a well 40 with a fiber-containing well treatment medium 36. The fibers for the well treatment medium 36 can be manufactured in a fiber manufacturing facility 10 located remotely from the well 40. The fiber manufacturing facility 10 can produce the fibers in the form of a continuous filamentary tow that is packaged into bales 12. The bales 12 can be transported from the fiber manufacturing facility 10 to a bale station 16 via a transporter 14. Once received on/in the bale station 16, one end of an unopened strand 18 of the continuous filamentary tow can be pulled off the bale 12 and fed to a puller 20. The puller 20 can then continuously draw the unopened strand 18 off of the bale 12. After being drawn off the bale 12, the unopened strand 18 can be fed to an opener 22. The opener 22 is configured to increase the average spacing between the individual continuous filaments of the unopened strand 18 to thereby produce an opened strand 24. The opened strand 24 can then be fed to a chopper 26, where it is cut into multiple cut fiber segments 28. The cut fiber segments 28 can then be introduced into a mixer 30, where they are mixed with well treatment liquids 32 and/or well treatment solids 34 to produce the well treatment medium 36. The well treatment medium 36 can then be provided to an injector 38 that pumps the well treatment medium 36 down the well 40.

The fiber manufacturing facility 10 can be any facility capable of producing fibers in the form of a tow made up of a plurality of individual continuous filaments. The number of individual continuous filaments in the tow can be the range of 25 to 500,000, in the range of 250 to 100,000, or in the range of 1,000 to 20,000. The tow can have a total denier in the range of 100 to 1,000,000, in the range of 1,000 to 250,000, or in the range of 10,000 to 100,000. Each individual continuous filament can have a denier per filament (dpf) in the range of 0.1 to 100, in the range of 0.5 to 50, or in the range of 1 to 10.

In certain embodiments, the continuous filamentary tow is formed of a water degradable material. The material from which the continuous filamentary tow is formed can be, for example, a cellulose ester (CE), polylactic acid (PLA), polyglycolic acid (PGA), polyvinyl alcohol (PVOH), and/or polyethylene terephthalate (PET). Additional examples of materials from which the continuous filamentary tow can be formed include, for example, polyhydroxyalkanoate, polyhydroxybutyrate, polybutyrate, polybutylene succinate, polycaprolactone, ethylene vinyl alcohol, polyamide, polypropylene, viscose rayon, polyethylene, polyacrylonitrile, silicate glass, acrylonitrile butadiene styrene, cycloolefin copolymer, ethylene-vinyl acetate, acrylic/PVC alloy, polyacetal, polyacrylate, polyamide-imide, polyaryletherketone, polybutadiene, polybutylene, polybutylene terephthalate, polychlorotrifluoroethylene, polycyclohexone dimethylene terepthlalate, polycarbonate, polyketone, polyester, polyetherketone, polyetherimide, polyethersulfone, polyethylenechlorinate, polyimide, polymethylpentene, polyolefins, polyphenylene oxide, polyphenylene sulfide, polyphtalamide, polystyrene, polysulfone, polytrimethylene terephthalate, polyurethane, polyvinyl acetate, polyvinyl chloride, and styrene-acrylonitrile.

In certain embodiments, the continuous filamentary tow comprises a cellulose ester (CE), with the CE making up at least 50 weight percent, at least 75 weight percent, at least 95 weight percent, or substantially all of the continuous filamentary tow. In one embodiment, the cellulose ester is cellulose acetate (CA).

The fiber manufacturing facility 10 can produce bales 12 made up of the continuous filamentary tow. The bales 10 of tow are to be distinguished from spools or rolls of tow, which are sometimes called "cheeses." Each bale 12 can be made by laying up the tow in a container—starting at the bottom of the container and feeding the continuous tow into the container until it is full. Physical compaction/compression of the tow in the container may also be used to increase the amount of tow in a single bale 12. The final bale 12 can be composed of numerous, substantially horizontal layers of the continuous tow, with at least one end of the tow being located near the top of the bale 12 for easy access.

Each bale 12 can have a rectangular or cubic shape, which makes for efficient transportation and storage due to stackability and space minimization. The bales 12 can be individually enclosed in packaging, such as, for example, cardboard packaging, reusable packaging, or sealed film packaging. The bales 12 can be provided on a standard pallet and can be loaded or unloaded with standard equipment, such as a fork lift and/or a pallet jack.

Each bale 12 can include in the range of 100 to 5,000,000 meters, in the range of 10,000 to 1,000,000 meters, or in the range of 100,000 to 500,000 meters of the continuous filamentary tow. The volume of each bale 12 can be in the range of 0.1 to 25 cubic meters or in the range of 0.5 to 5 cubic meters. The density of each bale 12 can be in the range of 100 to 5,000 kilograms per cubic meter or 250 to 1,500 kilograms per cubic meter. Additionally, each bale 12 can have a weight in the range of 100 to 5,000 kilograms or in the range of 250 to 1,500 kilograms.

The continuous filamentary tow can make up at least 50 percent, at least 75 percent, at least 95 percent, or substantially all of the total weight of the bale 12. The tow that makes up the bale 12 can be crimped to assist with binding the bale together via entanglement of the filaments. Such entanglement can minimize or eliminate the need for adhesives or binding agents. Accordingly, in certain embodiments, the bale 12 comprises less than 5 weight percent, less than 0.1 weight percent, or substantially no adhesive and/or binding agent.

A plurality of the bales 12 produced in the fiber manufacturing facility 10 can be loaded on the transporter 14 for transporting to the bale station 16. The transport distance between the fiber manufacturing facility 10 and the bale station 16 can be at least 15 kilometers or at least 150 kilometers, while the distance between the bale station 16 and the well 40 can be less than 500 meters or less than 100 meters.

The transporter 14 can be any means of transportation suitable for hauling multiple bales 12 over large distances. Examples of suitable transporters 14 include trucks, trains, barges, and airplanes.

The bale station 16 can be any type of equipment configured to hold at least one bale 12 of continuous filamentary tow in a stationary position while the strand 18 is drawn off the bale 12. In certain instances, the bale station 16 can simply be the transporter 14 (or a detachable trailer of the transporter 14) that is parked near the well 40 while the well treatment process is performed.

The bale station 16 can be configured to receive a single bale 12 or multiple bales 12. When the bale station 16 holds multiple bales 12, the puller 20 can be configured to simultaneously pull strands 18 off each of the bales 12. Alternatively, when the bale station 16 holds multiple bales 12, the bales 12 can be connected to one another in a serial manner, with the terminal strand end of a first bale being connected to the starting strand end of a second bale.

The puller 20 is initially loaded with a starting end of the strand 18 taken off the bale 12. Although the puller 20 can take a variety of forms, in one embodiment, the puller includes at least one pair of rotating rollers defining a nip for receiving the strand 18.

The strand 18 pulled off of bale 12 by the puller 20 can be substantially equivalent to the multifilament tow from which the bale 12 was formed in the fiber manufacturing facility 10. Accordingly, the strand 18 can be made up of a plurality of individual continuous filaments. The number of individual continuous filaments in the strand 18 can be the range of 25 to 500,000, in the range of 250 to 100,000, or in the range of 1,000 to 20,000. The strand 18 can have a total denier in the range of 100 to 1,000,000, in the range of 100,000 to 250,000, or in the range of 10,000 to 100,000, while each individual continuous filament can have a denier per filament (dpf) in the range of 0.1 to 100, in the range of 0.5 to 50, or in the range of 1 to 10. Further, the strand 18 can comprise less than 5 weight percent, less than 0.1 weight percent, or substantially no adhesive and/or binding agent.

Once loaded with the strand 18, the puller 20 can be used to continuously pull the strand 18 off the bale 12 for feeding to the opener 22. The puller 20 can be operable to pull the strand 18 from the bale 12 at a rate of at least 0.25 meters per second, at least 1 meter per second, or at least 2.5 meters per second.

As previously discussed, when the bale station 16 holds multiple bales 12, the puller 20 can simultaneously pull a strand off of each bale 12. Alternatively, when multiple bales 12 are used, multiple pullers 20 and/or openers 22 can also be used, with each bale 12 having its own dedicated puller 20 and/or opener 22.

Although the puller 20 is illustrated in FIG. 1 as being located between the bale station 16 and the opener 22, it should be understood that the puller 20 can be located at any position between the bale station 16 and the chopper 22. For example, the puller 20 can be located downstream of the opener 22, so as to pull the unopened strand 18 into the opener 22 and pull the opened stranded 24 out of the opener 22. In addition, in certain circumstances it may be advantageous to have a puller 20 before and after the opener 22. Optionally, the unopened stand 18 can be split into sub-bands before introduction in to the opener 22.

As indicated above, the opener 22 is configured to increase the average spacing between the individual continuous filaments of the unopened strand 18, thereby producing an opened strand 24. There are a variety of techniques that can be used for opening/blooming the strand 18 and a variety of ways to quantify the increase in degree of openness (i.e., spacing between adjacent filaments) provided by the opener 22.

One method of quantifying the increase in openness provided by the opener 22 is to compare the peripheral dimension of the unopened strand 18 and the peripheral dimension of the opened strand 24. FIG. 2 shows the peripheral dimension of an unopened strand 18 and an opened strand 24. In FIG. 2, the peripheral dimension is the length of the dashed lined surrounding the unopened and opened strands 18,24 and contacting the outermost filaments 25 of the strands, 18,24. As used herein, the term "peripheral dimension" denotes the distance around the outer periphery of a multifilament strand, where the distance is measured as the length of an imaginary, thin, continuous, flexible, tensioned band wrapped around the strand and extending in a plane that is normal to the direction of extension of the strand. By analogy, the peripheral dimension of a bundle of pencils held together by rubber band would be the length of the rubber band surrounding the bundle—where the bundle is analogous to a multifilament strand, each pencil is analogous to an individual filament, and the rubber band is analogous to the imaginary band wrapped around a strand.

In certain embodiments of the present invention, the opener 22 increases the spacing between individual filaments to a degree that causes the peripheral dimension of the strand to increase by 10 to 10,000 percent, 50 to 5,000 percent, or 100 to 1,000 percent. As such, the peripheral dimension of the opened strand 24 can be at least 10 percent, at least 50 percent, or at least 100 percent greater than the peripheral dimension of the unopened strand 18.

Another way to quantify the increase in openness provided by the opener 22 is to compare the maximum width of the unopened strand 18 and the maximum width of the opened strand 24. In certain embodiments of the present invention, the opener 22 causes the maximum width of the strand to increase by 10 to 20,000 percent, 50 to 10,000 percent, 100 to 5,000 percent, or 500 to 2,500 percent. As such, the maximum width of the opened strand 24 can be at least 10 percent, at least 50 percent, at least 100 percent, or at least 500 percent greater than the maximum width of the unopened strand 18. The maximum width of the strand is determined by laying the strand in a substantially straight, relaxed state on a horizontal surface and measuring the maximum horizontal dimension across (perpendicular to the direction of extension) the strand.

One other way to quantify the increase in openness provided by the opener 22 is to determine the retained crimp ratio (RCR) of the opened strand 24. The RCR is calculated by dividing the measured weight of a certain sample length of the opened strand 24 (which is at least partially crimped and/or entangled) by the measured or calculated weight of a completely straight (uncrimped and unentangled) strand of the same material having the same sample length. Thus, by way of example, an RCR value of 1 indicates that the opened strand 24 is made up of completely straight fibers, while an RCE of 2 indicates that the opened strand 24 retains crimping and/or entanglement to a degree that causes it to weigh twice as much per unit length as it would if it were completely straight. In certain embodiments of the present invention, the opener 22 produces an opened strand 24 exhibiting a RCR in the range of 0.5 to 5, 1 to 2.5, or 1.25 to 2. As such, the RCR of the opened strand 24 can be less than 5, less than 2.5, or less than 2.0.

As mentioned above, in certain circumstances, the tow/strand in the bale 12 can be crimped. When the unopened strand 18 pulled off the bale 12 is crimped, the opener 22 can act to at least partially decrimp the strand 18. This decrimping during opening can cause the length of the strand to increase by at least 10 percent, at least 25 percent, or at least 50 percent.

The opener 22 can employ one or more of the following techniques to open the strand 18: (i) tensioning the strand, (ii) mechanically flattening the strand, (iii) mechanically separating the strand, and (iv) pneumatically spreading the strand.

When tensioning is used to open the strand 18, the strand 18 can be subjected to a tension force of at least 5 Newtons or at least 20 Newtons. In certain embodiments, the tensioning is carried out by a differential tensioning mechanism using, for example, threaded rolls and/or differential gripping rolls. Differential tensioning can be provided by passing the strand 18 through two pairs of rolls, with the second pair rolls operating at a greater speed than the first pair of rolls. The pairs of rolls can both be smooth, can both be textured, or can include one smooth pair of rolls and one textured pair of rolls. In general, the larger the speed difference is between the first and second pairs of rolls, the greater the degree of strand opening provided by the rolls. Accordingly, it can be desirable for the second pair of rolls to rotate at a speed that is at least 10 percent, at least 25 percent, at least 50 percent, or at least 100 percent greater than the speed of the first pair of rolls.

When mechanical flattening is used to open the strand 18, the maximum width of the strand 18 can be increased by at least 50 percent, at least 100 percent, or at least 200 percent. Mechanical flattening can be carried out, for example, by pressing the strand between two rollers and/or by passing the strand over at least one smooth surface at an angle. FIG. 3 provides a schematic representation of the unopened strand 18 being passed over a smooth surface of a structural member 42 at a bend angle of less than 170 degrees or less than 120 degrees to thereby form the opened strand 24.

When mechanical separating is used to open the strand 18, the strand 18 can be passed over and/or through a comb-like mechanism having multiple teeth for physically dividing groups of the filaments.

When pneumatic spreading is used to open the strand 18, one or more pneumatic nozzles can be used to direct high velocity air toward the strand 18. The air jets discharged from the nozzles spread the strand apart by forcing air between at least a portion of the individual filaments. When air jets are used, the velocity of the air as it initially contacts the strand can be least 0.5 meters per second, at least 2 meters per second, or at least 5 meters per second. After opening, the opened strand 24 can, optionally, be treated with a surface activating agent and/or a degradation promoting agent.

The opened strand 24 can then be cut by chopper 26 into a multitude of cut fiber segments 28. In certain embodiments, the chopper 26 can be configured to cut the opened strand 24 into lengths in the range of 0.5 to 100 millimeters, in the range of 1 to 50 millimeters, or in the range of 2 to 20 millimeters. After cutting, the cut fiber segments 28 can, optionally, be treated with a surface activating agent and/or a degradation promoting agent.

The surface activating agent can be added, before or after cutting, to help the individual fibers repel one another and/or to help promote adhesion of the individual fibers to an additive, such as a proppant. The degradation promoting agent can be added, before or after cutting, to help accelerate degradation of the individual fibers once they reach their desired location, such as in a subterranean formation.

The cut fiber segments 28 can be formed of a water degradable material with degradation properties that are specifically tuned to the needs of the well treatment method and well conditions. For example, the cut fiber segments 28 can exhibit a percent weight loss of not more than 25 percent after 0.1 days in liquid deionized water maintained at 130° C. Further, the cut fiber segments 28 can exhibit a percent weight loss of at least 75 percent after 7 days in liquid deionized water maintained at 130° C.

The cut fiber segments 28 can be introduced into a mixer 30 for combining the cut fiber segments 28 with one or more additional components to form the well treatment medium 36. The additional components added to the cut fiber segments 28 in the mixer 30 can include treatment liquids 32 and/or treatment solids 34. The treatment liquids 32 and solids 34 can be stored in containers located near the well 40. The treatment liquids 32 can include, for example, a carrier fluid and/or a viscosifying agent. The treatment solids 34 can include, for example, a proppant and/or a cement composition. The well treatment medium 36 produced by the mixer 30 can contain the cut fiber segments 28 in an amount in the range of 0.5 to 50 weight percent or in the range of 1 to 10 weight percent.

The well treatment medium 36 can then be directed to an injector 38, which introduces the well treatment medium 36 into the well 40. This introduction of the well treatment medium 36 into the well 40 can be carried out as part of a drilling, cementing, or/and stimulation process. In one embodiment the well treatment medium 36 is introduced into the well 40 as part of a hydraulic fracturing process. The well 40 can be either an onshore oil and/or gas well or an offshore platform.

In certain instances, it may be necessary to use one or more storage bins (not shown) to store the cut fiber segments 28 prior to mixing in the mixer 30 and/or to store the well treatment medium 36 prior to injection into the well 40. However, such storage bins are unnecessary when the rate of production of the cut fiber segments 28 is controlled to match the required amount of fibers in the well treatment medium 36 as it is introduced into the well 40. In such a system, the puller 20, opener 22, chopper 26, and/or mixer 30 operate on demand to make cut fiber segments 28 only as they are needed and only at the rate required for the well treatment operation. During operation of the fiber delivery system, the total rate of production of the cut fiber segments 28 can be at least 1 kilogram per minute, at least 5 kilograms per minute, at least 10 kilograms per minute, or at least 20 kilograms per minute.

The system and method described herein provides an efficient and effective system for delivering cut fibers to the well 40. This system allows for large-scale manufacturing of fiber-containing bales 12 at a location remote to the well 40, efficient transporting of the bales 12 to a location near the well 40, and efficient processing of the fibers via onsite opening, cutting, mixing, and injection of the fibers. In certain embodiments, the fiber manufacturing facility 10 can be located at least 15 kilometers or at least 150 kilometers from the bale station 16, the puller 20, the opener 22, the chopper, 26, the mixer 30, the injector 38, and/or the well 40, while the distance between the well 40 and the bale station 16, the puller 20, the opener 22, the chopper, 26, the mixer 30, and/or the injector 38 can be less than 500 meters or less than 100 meters.

In certain embodiments, the bale station 16, puller 20, opener 22, chopper 26, and/or mixer 30 can be mounted on a common portable structure (e.g., truck, truck bed, trailer, or skid) for ease of transport from one well to another by truck, rail, or ship.

EXAMPLES

The following experiment was performed to demonstrate improved dispersibility of fibers in a fluid resulting from opening or blooming a multifilament fiber tow before cutting or chopping the fibers. A crimped cellulose acetate fiber tow with 3.0 denier per filament and total denier of 32,000 was subjected to varying degrees of opening/blooming using a commercial filter plug maker. The amount of opening/blooming applied to the tow was varied by adjusting the tension applied through two pair of differential gripping rolls—the feed rolls and the tension rolls. Each pair of rolls consisted of one rubber and one metal roll, one of which was grooved to spread or separate the individual fibers from one another. The amount of tension applied between the feed and tension rolls was set by adjusting the relative speeds of the rolls. No or minimal tension was applied to the tow between the rolls when the feed and tension roll speeds were identical or about the same. High tension was applied to the tow between the rolls when the tension roll speed was much greater than the feed roll speed. Before passing through these two pair of differential gripping rolls, the tow was partially opened/bloomed by passing through 3 different banding jets in the plug maker.

Three different levels of opening/blooming of the fiber tow were tested: 1) no opening/blooming by not passing the tow through the plug maker (sample A), 2) some opening/blooming by passing the tow through the plug maker with little or no tension applied between the two pair of differential gripping rolls (sample B), and 3) high degree of opening/blooming by passing the tow through the plug maker with high tension applied between the two pair of differential gripping rolls (sample C). Specifically, in the case of sample B the speed of the tension rolls was set to be 95% that of the feed rolls while sample C was prepared by setting the tension roll speed 225% that of the feed rolls. In both cases the tow speed in the plug maker was set at 14 meters per minute.

The effects of these tow opening/blooming experiments were determined by 1) measuring the width of the fiber tow band with no tension applied, 2) calculating the retained crimp ratio (RCR), and 3) cutting the fiber tow into short (6 mm) fibers and dispersing some (1 g) into water (800 g) and measuring the height of the fibers in a quart jar in which the total liquid height was 4.5 inches. Retained crimp ratio (RCR) was measured by ratio of the mass of the opened fiber tow to the mass based on the total denier of the fiber tow. Specifically, opened fiber tow samples were cut to 6-inch lengths and the mass of the resulting cut fiber was ratioed to that expected for 6 inches of a fully extended or uncrimped 32,000 total denier fiber tow, namely 0.542 grams. Results of these experiments are shown in the Table below:

| Sample | Tow Width (in) | Mass of 6-in (g) | Retained Crimp Ratio (RCR) | Fiber Height in Water (in) |
|--------|----------------|------------------|-----------------------------|-----------------------------|
| A      | 1              | 1.551            | 2.86                        | 2                           |
| B      | 10             | 1.047            | 1.93                        | 3                           |
| C      | 12             | 0.856            | 1.58                        | 3.5                         |

As shown in the above table by comparing the results from samples A and B, the width of the filter tow was increased significantly, the RCR was decreased, and the height of dispersed fibers in water was increased just by passing the tow through the banding jets of the plug maker. Additional opening/blooming was obtained by setting the tension rolls at a much higher speed than the feed rolls. This is evident by comparing the results from samples B and C. This experiment demonstrates the benefit of opening or blooming a fiber tow to separate or spread into individual fibers on fiber dispersion into a liquid.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A well treatment method comprising:
   (a) providing at least 100 meters of a continuous filamentary tow in the form of a bale wherein said continuous filamentary tow is formed of a water degradable material that exhibits a weight loss of at least 75 percent after 7 days in liquid deionized water maintained at 130° C.;
   (b) drawing a strand of said filamentary tow off said bale, wherein said strand comprises a plurality of individual continuous filaments;
   (c) increasing the average spacing between said individual continuous filaments of said strand to thereby produce an opened strand, wherein said strand is passed over at least one smooth surface at a bend angle of less than 70 degrees;
   (d) cutting said opened strand into cut fiber segments;
   (e) combining said cut fiber segments with one or more additional components to form a well treatment medium; and
   (f) introducing said well treatment medium into a well.

2. The well treatment method of claim 1, wherein said bale comprises at least 100,000 meters of said continuous filamentary tow.

3. The well treatment method of claim 2, wherein said bale has a volume in the range of 0.1 to 25 cubic meters, a density in the range of 100 to 5,000 kilograms per cubic meter, and a weight in the range of 100 to 5,000 kilograms, wherein said continuous filamentary tow makes up at least 50 percent of the total weight of said bale.

4. The well treatment method of claim 1, wherein said continuous filamentary tow comprises one or more material selected from the group consisting of a cellulose ester and polyvinyl alcohol.

5. The well treatment method of claim 1, wherein cellulose acetate makes up at least 50 weight percent of said continuous filamentary tow in said bale.

6. The well treatment method of claim 1, wherein said strand is pulled from said bale at a rate of at least 0.25 meters per second.

7. The well treatment method of claim 1, wherein said strand comprises in the range of 25 to 500,000 of said individual continuous filaments, wherein said strand has a total denier in the range of 100 to 1,000,000, and wherein each individual continuous filament of said strand has a denier per filament in the range of 0.1 to 100.

8. The well treatment method of claim 1, wherein said increasing of step (c) causes a peripheral dimension of said strand to increase by at least 10 percent.

9. The well treatment method of claim 1, wherein said strand drawn off said bale is crimped and wherein said increasing of step (c) at least partially decrimps said strand to thereby increase the length of said strand by at least 10 percent.

10. The well treatment method of claim 1, wherein said increasing of step (c) includes at least one of the following steps: tensioning said strand, mechanically flattening said strand, mechanically separating said strand, and pneumatically spreading said strand.

11. The well treatment method of claim 10, wherein said tensioning includes differential tensioning using threaded rolls and/or differential gripping rolls.

12. The well treatment method of claim 10, wherein said increasing of step (c) includes mechanically flattening said strand in a manner such that a maximum width of said strand increases by at least 50 percent.

13. The well treatment method of claim 12, wherein said mechanically flattening includes pressing said strand between two rollers.

14. The well treatment method of claim 10, wherein said increasing of step (c) includes mechanically separating said strand by passing said strand over and/or through a comb mechanism having multiple teeth for physically dividing groups of said individual continuous filaments.

15. The well treatment method of claim 10, wherein said increasing of step (c) includes pneumatically spreading said strand by forcing air between at least a portion of said individual continuous filaments.

16. The well treatment method of claim 1, wherein said cut fiber segments have a length in the range of 0.5 to 100 millimeters.

17. The well treatment method of claim 1, wherein said well treatment medium comprises in the range of 0.5 to 50 weight percent of said cut fiber segments, and wherein said one or more additional components of said well treatment medium are selected from the group consisting of a proppant, a carrier fluid, a viscosifying agent, a cement composition, and combinations thereof.

18. The well treatment method of claim 1, further comprising using said well treatment medium for hydraulic fracturing of said well.

19. The well treatment method of claim 1, wherein all of steps (b) through (e) are performed within 500 meters of said well.

20. The well treatment method of claim 1, wherein said providing of step (a) includes manufacturing said bale at a fiber manufacturing facility and transporting said bale from said fiber manufacturing facility to a bale station, wherein said fiber manufacturing facility and said bale station are spaced at least 15 kilometers apart and wherein said bale station is located within 500 meters of said well.

21. A well treatment system comprising:
(a) a bale station for receiving a bale of continuous filamentary tow, wherein said continuous filamentary tow is formed of a water degradable material that exhibits a weight loss of at least 75 percent after 7 days in liquid deionized water maintained at 130° C.;
(b) a puller for drawing a strand of said continuous filamentary tow off said bale, wherein said strand comprises at least 100 individual continuous filaments;
(c) an opener for receiving said strand and increasing the average spacing between said individual continuous filaments, thereby producing an opened strand, wherein said opener comprises a flattening surface across which said strand passes at a bend angle of less than 170 degrees; and
(d) a chopper for cutting said opened strand into cut fiber segments.

22. The well treatment system of claim 21, wherein said opener comprises at least one of the following: (i) a tensioning mechanism for imparting tension on said strand; (ii) a pair of rollers for flattening said strand therebetween; and (iii) one or more pneumatic nozzles for directing high velocity air toward said strand.

23. The well treatment system of claim 21, wherein said puller comprises a pair of rotating rollers defining a nip for receiving said strand.

24. The well treatment system of claim 21, further comprising a portable structure, wherein said puller, said opener, and said chopper are all mounted to said portable structure.

25. The well treatment system of claim 21, further comprising a liquid storage container for providing a liquid treatment component to said mixer for mixing with said cut fiber segments; and a solids storage container for provided a solids treatment component to said mixer for mixing with said cut fiber segments.

26. The well treatment system of claim 25, further comprising a mixer for combining said cut segments with one or more additional components to form a well treatment medium; and an injector for introducing said well treatment medium into a well.

27. The well treatment method of claim 1, further comprising treating said cut fiber segments with a surface activating agent and/or a degradation promoting agent after said cutting of step (d).

* * * * *